(12) United States Patent
Liu et al.

(10) Patent No.: US 6,798,949 B2
(45) Date of Patent: Sep. 28, 2004

(54) OPTICAL ASSEMBLY WITH INTEGRATED LENS PROTRUSION

(75) Inventors: Qing Liu, Shenzhen (CN); Mingbao Zhou, Shenzhen (CN); River Yang, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 117 days.

(21) Appl. No.: 10/170,550

(22) Filed: Jun. 11, 2002

(65) Prior Publication Data
US 2003/0138200 A1 Jul. 24, 2003

(30) Foreign Application Priority Data
Jan. 18, 2002 (TW) ..................... 91200437 U

(51) Int. Cl.[7] .............................. G02B 6/32; G02B 6/24
(52) U.S. Cl. .............................. 385/33; 385/34; 385/78; 385/93
(58) Field of Search .............................. 385/31, 33–35, 385/39, 49, 78, 83, 92–93

(56) References Cited

U.S. PATENT DOCUMENTS

| | | | |
|---|---|---|---|
| 4,834,494 A | * | 5/1989 | DeMeritt et al. ............. 385/33 |
| 6,582,135 B2 | * | 6/2003 | Brun et al. ................... 385/34 |
| 6,694,077 B2 | * | 2/2004 | Liu et al. ..................... 385/33 |
| 2002/0076151 A1 | * | 6/2002 | Kinard et al. ................ 385/33 |

* cited by examiner

Primary Examiner—Hemang Sanghavi
Assistant Examiner—Omar Rojas
(74) Attorney, Agent, or Firm—Wei Te Chung

(57) ABSTRACT

An optical assembly includes an input fiber (30) and an output fiber (31), a ferrule (32) receiving the input and output fibers therein, a molded lens (33) and a filter (34). The molded lens includes a solid cylindrical main body (334), and an annular protrusion (333) extending from a front end of the main body. The main body has an oblique rearward end face (331), and an aspherical forward end face (332) opposite to the rearward end face. The ferrule also has an oblique forward end face (322) which is close to and substantially parallel to the oblique rearward end face of the molded lens. The filter is attached to a forward end of the annular protrusion. Light rays from the input fiber pass through and are made parallel by the molded lens. Parallel rays of a predetermined wavelength are transmitted through the filter. Parallel rays having other wavelengths are reflected at the filter and transmit through the output fiber.

10 Claims, 3 Drawing Sheets

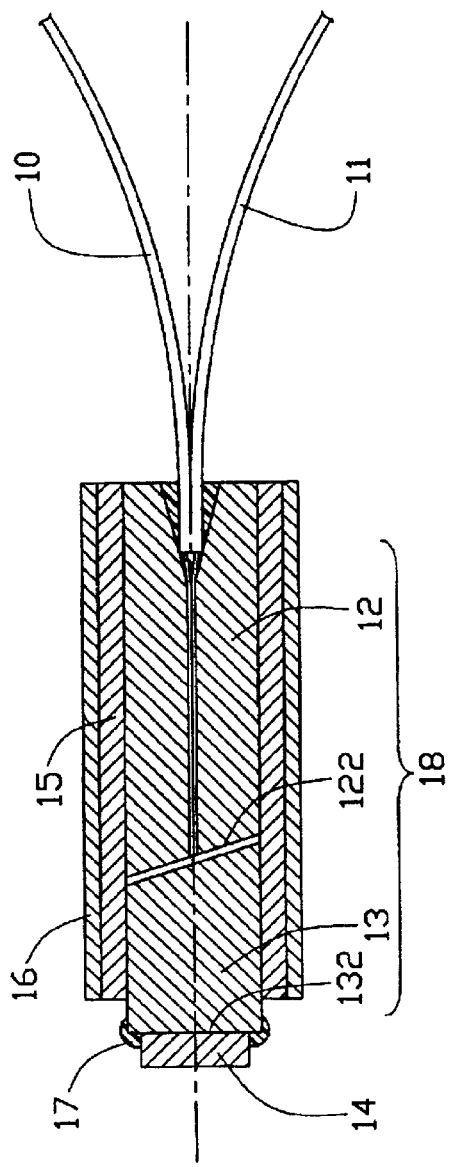
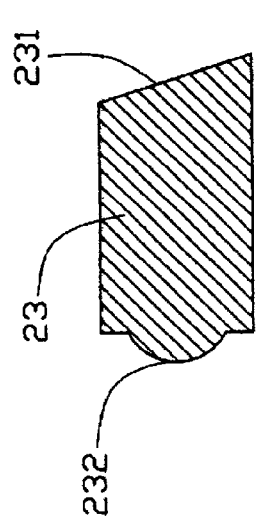
FIG. 1 (PRIOR ART)
FIG. 2 (PRIOR ART)

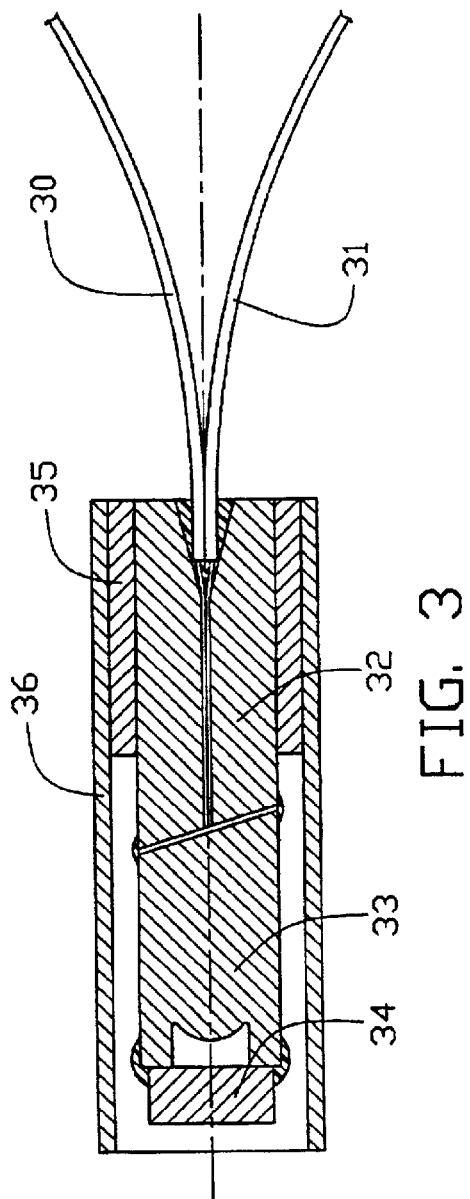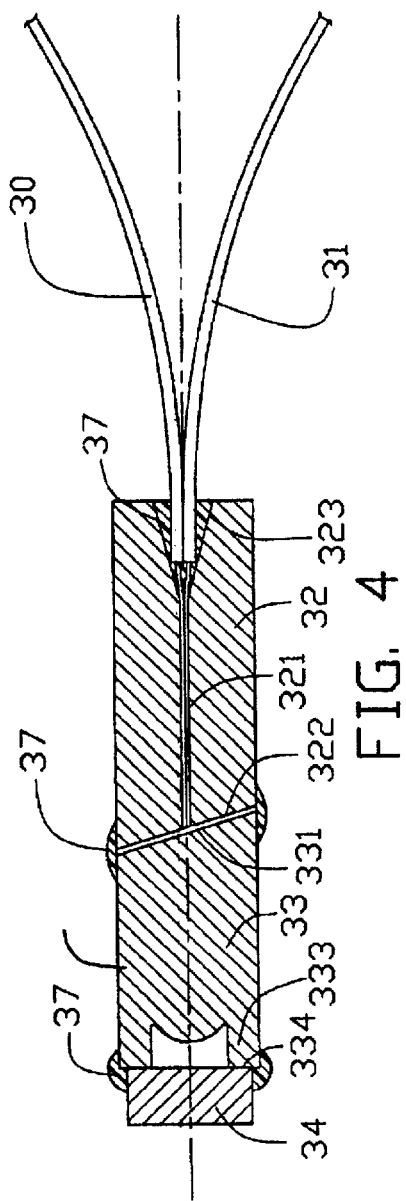

OPTICAL ASSEMBLY WITH INTEGRATED LENS PROTRUSION

BACKGROUND OF THE INVENTION

1. Field of the Invention

The present invention relates to optical assemblies, and more particularly to an optical assembly used in a Dense Wavelength Division Multiplexer (DWDM).

2. Description of the Prior Art

As optical fiber technology is being more broadly applied in the telecommunications, data communications and community antenna television (CATV) industries, the fiber optic component industry is now confronted with increasingly demanding requirements for good performance and high reliability. Currently, most design and manufacturing of in-line fiber optic components are based on optical collimators, which provide low-loss light transmission from the input fiber to the output fiber through an optical element. Optical collimators are basic building blocks of fiber optic components. The reliability and level of performance of fiber optic components depends heavily on the reliability and performance characteristics of their optical collimators.

A Graded Index (GRIN) lens is a popular optical element which is utilized in an optical collimator for collimating scattered light. As show in FIG. 1, a conventional optical collimator 18 comprises an input optical fiber 10, an output optical fiber 11, a glass ferrule 12, and a GRIN lens 13. A through hole 121 defined in the ferrule 12 receives the optical fibers 10, 11 therein. The ferrule 12 and the GRIN lens 13 are aligned and fixed in a glass inner tube 15. A stainless steel tube 16 encloses the glass inner tuber 15, thereby providing mechanical protection. A filter 14 is attached to an end face 132 of the GRIN lens 13 with the help of epoxy resin 17.

The conventional optical collimator has some disadvantages. First, the filter 14 is directly attached to a surface of the GRIN lens 13 with the epoxy resin 17. When the resin heats up during use, the filter 14 is subjected to uneven heating. This changes and adversely affects performance of the filter 14. In addition, humidity created by the epoxy resin 17 adversely affects performance of the GRIN lens 13. Second, accurate alignment between the ferrule 12 and the GRIN lens 13 depends on accurate formation of the inner tube 15. Therefore, the inner tube 15 must be made with unduly high precision. Third, the GRIN lens 13 is conventionally made by an ion exchange method, which requires that, the GRIN lens 13 must be further polished after initial formation. Furthermore, chemicals used in the ion exchange method are harmful to users and pollute the environment.

Recently, a molded collimating lens 23 as shown in FIG. 2 has been used in an optical collimator instead of a GRIN lens. The collimating lens 23 is made by a molding method. The collimating lens 23 has an aspherical forward face 232 and an oblique rearward face 231. Molded optical collimating lenses overcome the disadvantage of environmental pollution. However, a molded lens has the curved face 232, therefore fixing a filter to the curved face 232 is inconvenient. A copending application with an unknown serial number filed on Jun. 5, 2002, titled "OPTICAL COLLIMATOR WITH MOLDING LENS", with the same inventors and the same assignee as the present invention, discloses one approach to this problem.

An improved optical assembly overcoming the above-described numerous disadvantages is desired.

SUMMARY OF THE INVENTION

Accordingly, an object of the present invention is to provide an inexpensive optical assembly which has good optical performance.

Another object of the present invention is to provide an optical assembly that allows easy and precise assembly of its optical components.

A further object of the present invention is to provide an optical assembly that is environmentally friendly.

To achieve the above-mentioned objects, an optical assembly in accordance with the present invention comprises an input optical fiber and an output optical fiber, a glass ferrule receiving the input and output optical fibers therein, a molded lens, and a filter. The molded lens is fixed to the ferrule, and comprises a solid cylindrical main body with an annular-shaped protrusion extending from a forward end of the main body. The main body comprises an oblique rearward end face and an aspherical forward end face opposite to the rearward end face. The ferrule has an oblique forward end face which is fixed close to and substantially parallel with the oblique rearward end face of the molded lens. The filter is attached onto an end face of the annular protrusion.

Other objects, advantages and novel features of the invention will become more apparent from the following detailed description when taken in conjunction with the accompany drawings, in which:

BRIEF DESCRIPTION OF THE DRAWINGS

FIG. 1 is a cross-sectional view of a conventional optical collimator with a filter attached thereto;

FIG. 2 is a cross-sectional view of a molded collimating lens of a conventional collimator;

FIG. 3 is a cross-sectional view of an optical assembly in accordance with the present invention;

FIG. 4 is a cross-sectional view of an optical collimator of FIG. 3;

DETAILED DESCRIPTION OF THE INVENTION

Figure 5:
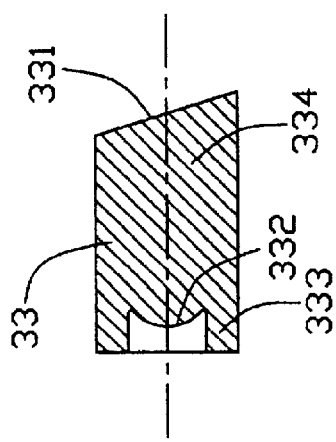
FIG. 5 is a cross-sectional view of a molded lens of the optical collimator of FIG. 3.

Referring to FIG. 3, an optical assembly in accordance with the present invention comprises an input optical fiber 30, an output optical fiber 31, a glass ferrule 32, a molded lens 33, a filter 34, an inner tube 35 and an outer sleeve 36.

Referring to FIG. 4, the ferrule 32 includes an oblique forward end 322, a rearward end (not labeled) opposite to the forward end 322, a through hole 321 and an entry hole 323. The entry hole 323 communicates between the through hole 321 and the rearward end of the ferrule 32. The oblique forward end 322 inclines at an angle preferably between 6 and 8 degrees relative to a hypothetical plane normal to a longitudinal center line of the ferrule 32.

Referring to FIG. 5, the molded lens 33 is made of glass or another suitable material. The molded lens 33 comprises a solid cylindrical main body 334 and an annular protrusion 333 extending forward from the main body 334. The main body 334 has an oblique rearward end face 331, and an aspherical forward end face 332. The forward end face 332 is opposite to the rearward end face 331 and is formed in a space defined within the annular protrusion 333. The rearward end face 331 inclines preferably at an angle of between 6 and 8 degrees relative to a hypothetical plane normal to a longitudinal center line of the molded lens 33.

Referring back to FIG. 3, the inner tube 35 is made of a glass material. A length of the inner tube 35 is less than a length of the ferrule 32. An internal diameter of the inner tube 35 is slightly greater than a diameter of the ferrule 32, to enable the inner tube 35 to snugly secure the ferrule 32 therein. The outer sleeve 36 is made of a metallic material. An internal diameter of the outer sleeve 36 is slightly greater than an outer diameter of the inner tube 35 to enable the outer sleeve 36 to snugly secure the inner tube 35 therein.

Referring also to FIG. 3, in assembly, ends of jackets (not labeled) of the optical fibers 30 and 31 are stripped, to expose a bare end of each optical fiber core. The optical fiber cores are inserted into the through hole 321, and portions of the bare optical fiber cores that protrude beyond the oblique forward end 322 of the ferrule 32 are ground and polished to be coplanar with the oblique forward end 322. Ends of jacketed portions of the optical fibers 30, 31 are fixed in the entry hole 323 by epoxy resin 37. The combined ferrule 32 and optical fibers 30, 31 is inserted into the inner tube 35. The molded lens 33 is then attached to the ferrule 32 using epoxy resin 37, with the oblique forward end 322 of the ferrule 32 being fixed parallel to and a predetermined distance from the rearward end face 331 of the molded lens 33. The filter 34 is fixed onto an end face of the annular protrusion 333 of the molded lens 33 using the epoxy resin 37 (see FIG. 4). The combined molded lens 33, ferrule 32 and inner tube 35 is inserted into the outer sleeve 36 and secured therein.

Figure 6:
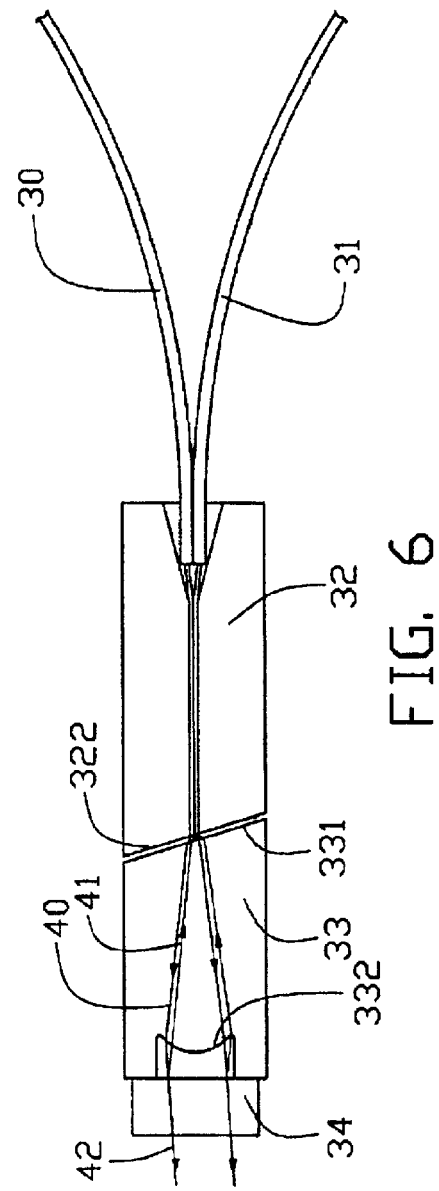
FIG. 6 is a schematic view showing optical paths in the optical collimator of FIG. 3.

Preferring to FIG. 6, a focal point (not labeled) of the molded lens 33 is located at the oblique forward end 322 of the ferrule 32. Input light beams 40 emitted from the input optical fiber 30 are transmitted through the molded lens 33 in a forward direction. The forward end face 332 of the molded lens 33 transmits the input light beams 40 in a forward direction as parallel light beams (not labeled). Said parallel light beams are then split by the filter 34, and are transmitted in a forward direction through the filter 34 as parallel light beams 42. Parallel light beams having other than a predetermined a wavelength are reflected back to the forward end face 332, and are transmitted through the molded lens 33 as reflective light beams 41 in a rearward direction. Said reflective light beams 41 are focused on an end of the output optical fiber 31, and are transmitted through the output optical fiber 31.

It should be understood that various changes and modifications to the presently preferred embodiments described herein will be apparent to those skilled in the art. Such changes and modifications may be made without departing from the spirit and scope of the present invention and without diminishing the present invention's advantages. Thus, it is intended that such changes and modifications be covered by the appended claims.

What is claimed is:

1. An optical assembly comprising:
    an input optical fiber;
    an output optical fiber;
    a holding device within which the input and output optical fibers are arranged; and
    a lens made by a molding method comprising a protrusion for arranging a filter onto an end face thereof, and a solid cylindrical main body from which the protrusion extends for enabling passage of light between the input and output optical fibers and the filter;
    wherein when input light beams emitted from the input optical fiber are transmitted to the lens, parallel light beams having a predetermined wavelength are passed from the lens through the filter, and reflective light beams not having the predetermined wavelength are reflected by the filter and are transmitted through the lens and are coupled into the output optical fiber by the lens.

2. The optical assembly in accordance with claim 1, wherein the main body has an oblique end face and an aspherical end face, the aspherical end face being opposite to the oblique end face, and the aspherical end face being formed in a space defined within the protrusion.

3. The optical assembly in accordance with claim 1, wherein the holding device comprises a ferrule fixed to the lens and the ferrule defines a through hole retaining the input and output optical fibers therein.

4. The optical assembly in accordance with claim 3, wherein the ferrule defines a receiving hole in communication with the through hole.

5. The optical assembly in accordance with claim 4, wherein the ferrule comprises an oblique end face mounting in close proximity to the oblique end face of the lens, and the oblique end face of the ferrule inclines at an angle between 6 and 8 degrees relative to a hypothetical plane normal to a longitudinal center line of the ferrule.

6. The optical assembly in accordance with claim 3, further comprising an inner tube partially retaining the ferrule therein.

7. The optical assembly in accordance with claim 6, further comprising an outer tube retaining the inner tube therein.

8. An optical assembly comprising:
    an input optical fiber;
    an output optical fiber;
    a holding device in which the input and output optical fibers are arranged;
    a lens comprising a protrusion and a solid cylindrical main body from which the protrusion extends; and
    a filter arranged onto an end face of the protrusion of the lens;
    wherein the solid cylindrical main body enables passage of light between the input and output optical fibers and the filter; and when input light beams are emitted from the input optical fiber, they are transmitted through the lens, and parallel light beams having a predetermined wavelength are passed from the lens through the filter, and reflective light beams not having the predetermined wavelength reflected by the filter and are transmitted through the lens and are coupled into the output optical fiber by the lens.

9. An optical assembly comprising:
    an input optical fiber;
    a holder enclosing said input fiber;
    a one-piece molded lens comprising a solid cylindrical main body defining one end attached to a front end of said holder opposite to said input fiber, and further defining an opposite end with a protrusion extending therefrom and an inner curved face spaced from each other in an axial direction thereof; and
    a filter attached onto said protrusion.

10. The assembly in accordance with claim 9, wherein said lens and said holder are arranged in a side-by-side manner.

* * * * *